(12) United States Patent
Park

(10) Patent No.: US 9,007,620 B2
(45) Date of Patent: Apr. 14, 2015

(54) IMAGE FORMING APPARATUS AND METHOD OF CONTROLLING THE SAME

(75) Inventor: Seong Il Park, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 1735 days.

(21) Appl. No.: 12/025,262

(22) Filed: Feb. 4, 2008

(65) Prior Publication Data

US 2008/0186538 A1    Aug. 7, 2008

(30) Foreign Application Priority Data

Feb. 5, 2007  (KR) .................. 10-2007-0011858
Jan. 22, 2008  (KR) .................. 10-2008-0006775

(51) Int. Cl.
G06F 3/12        (2006.01)
G06K 15/02       (2006.01)

(52) U.S. Cl.
CPC ...... *G06F 3/1213* (2013.01); *H04N 2201/0067* (2013.01); *G06F 3/1204* (2013.01); *G06F 3/1247* (2013.01); *G06F 3/128* (2013.01); *G06F 3/1284* (2013.01); *G06F 3/1285* (2013.01)

(58) Field of Classification Search
CPC .............................. G06F 3/128; G06F 3/1247
USPC ............ 358/1.1, 1.2, 1.6, 1.9, 1.15, 501, 401; 348/207.1, 207.2
See application file for complete search history.

(56) References Cited

U.S. PATENT DOCUMENTS

| 5,862,310 | A | * | 1/1999 | Crawford et al. ............ 358/1.18 |
| 6,104,325 | A | * | 8/2000 | Liaw et al. ...................... 341/63 |
| 6,553,374 | B1 | * | 4/2003 | Yamamoto et al. ................... 1/1 |
| 6,658,456 | B1 | * | 12/2003 | Shimoosawa ................. 709/206 |
| 6,662,186 | B1 | * | 12/2003 | Esquibel et al. ...................... 1/1 |
| 6,934,044 | B1 | * | 8/2005 | Khandelwal ................... 358/1.15 |
| 7,173,730 | B1 | * | 2/2007 | Suzuki et al. ................. 358/1.16 |
| 7,423,776 | B2 | * | 9/2008 | Murata ......................... 358/1.16 |
| 7,580,611 | B2 | * | 8/2009 | Mantani ........................ 386/248 |
| 8,032,571 | B2 | * | 10/2011 | Lee ............................... 707/824 |
| 2003/0197884 | A1 | * | 10/2003 | Takamiya .................... 358/1.13 |
| 2005/0113025 | A1 | * | 5/2005 | Akamatsu et al. ........... 455/41.3 |
| 2005/0190399 | A1 | * | 9/2005 | Nakaoka et al. ............ 358/1.15 |
| 2005/0212914 | A1 | * | 9/2005 | Seto et al. .................. 348/207.1 |
| 2006/0018223 | A1 | * | 1/2006 | Ji et al. ......................... 369/47.12 |
| 2006/0039033 | A1 | * | 2/2006 | French et al. ................ 358/1.16 |
| 2006/0101117 | A1 | * | 5/2006 | Yabe et al. ..................... 709/206 |
| 2006/0119872 | A1 | * | 6/2006 | Koizumi ...................... 358/1.13 |

(Continued)

FOREIGN PATENT DOCUMENTS

| JP | 2005-349664 |   | 12/2005 |           |
| JP | 2006-338442 | * | 12/2006 | G06F 12/00 |

OTHER PUBLICATIONS

Chinese Office Action issued Jan. 8, 2010 in CN Application No. 2008100951196.

*Primary Examiner* — Beniyam Menberu

(74) *Attorney, Agent, or Firm* — Staas & Halsey LLP

(57) ABSTRACT

An image forming apparatus and a method of controlling the same, the method including: determining whether the extension of a data file is registered as a printable extension in an image forming apparatus; analyzing header of the data file to determine whether the data file is printable, if the extension is not registered as a printable extension in the image forming apparatus; and registering the extension in the image forming apparatus as a printable extension, if the data file is determined to be printable.

20 Claims, 5 Drawing Sheets

(56) References Cited

U.S. PATENT DOCUMENTS

| | | | |
|---|---|---|---|
| 2006/0136389 A1* | 6/2006 | Cover et al. | 707/3 |
| 2006/0215184 A1* | 9/2006 | Murakami | 358/1.1 |
| 2006/0221367 A1* | 10/2006 | Shiokawa | 358/1.13 |
| 2007/0279689 A1* | 12/2007 | Aoki et al. | 358/1.16 |
| 2008/0030780 A1* | 2/2008 | Izawa | 358/1.16 |
| 2008/0195772 A1* | 8/2008 | Ferlitsch | 710/52 |
| 2011/0090349 A1* | 4/2011 | Kojima | 348/207.2 |

* cited by examiner

Fig. 2

| FORMAT TYPE | EXTENSION |
|---|---|
| JPEG | jpg, jpe, jpeg, ... |
| BMP | bmp, bmb, bm, ... |
| TIFF | tiff, tif, tf, ... |
| PDF | pdf, spdf, pf, ... |
| ⋮ | ⋮ |

Fig. 3

| FORMAT TYPE | EXTENSION |
|---|---|
| JPEG | jpg, jpe, jpeg, jp, ... |
| BMP | bmp, bmb, bm, ... |
| TIFF | tiff, tif, tf, ... |
| PDF | pdf, spdf, pf, ... |
| ⋮ | ⋮ |

IMAGE FORMING APPARATUS AND METHOD OF CONTROLLING THE SAME

CROSS-REFERENCE TO RELATED APPLICATIONS

This application claims the benefit of Korean Patent Application No. 2007-11858, filed in the Korean Intellectual Property Office on Feb. 5, 2007, and Korean Patent Application No. 2008-6775, filed in the Korean Intellectual Property Office on Jan. 22, 2008, the disclosures of which are incorporated herein by reference in their entirety.

BACKGROUND OF THE INVENTION

1. Field of the Invention

The present general inventive concept relates generally to an image forming apparatus and a method of controlling the same, and more particularly, to an image forming apparatus capable of printing a data file when the extension of the data file is a printable extension and a method of controlling the same.

2. Description of the Related Art

In general, an image forming apparatus, such as a port printer and a multifunctional device, receives printing data from an information processing apparatus, such as a computer, or an external memory apparatus, such as a universal serial bus (USB) memory stick, to print the printing data on a printing sheet.

A user loads an application program from a computer to create or load a file including text and an image and to generate printing data and transmits the printing data to the image forming apparatus to print the printing data on the printing sheet.

When a file is initially created or stored on the application program, the user designates the format of a file, such as BMP, PDF, or TIFF, to create or store the file. When a printing command is input on the application program in order to print the corresponding file, a printer driver generates the printing data to transmit the printing data to the image forming apparatus.

In a conventional image forming apparatus, a data file to be printed that is received from the information processing apparatus or the external memory apparatus is printed when the data file can be printed by the image forming apparatus. That is, when the extension of the data file to be printed is registered as a printable extension in the image forming apparatus, the data file to be printed is determined as a printable file. Also, when the extension of the data file to be printed is not registered as the printable extension in the image forming apparatus, the header content of the data file to be printed is additionally analyzed to determine whether the data file is a printable file.

However, according to the conventional art, since the header content of the data file must be analyzed each time that the extension of the data file to be printed is determined to be different from the extension registered in the image forming apparatus to determine whether the data file to be printed is a printable file, a printing time increases.

SUMMARY OF THE INVENTION

The present general inventive concept provides an image forming apparatus capable of reducing a time required for determining whether a data file to be printed is printable to reduce a printing time, and a method of controlling the same.

The present general inventive concept also provides an image forming apparatus and a method of controlling the same, capable of shortening a printing time by displaying only printable data files while reducing a time required for determining whether a data file to be printed is printable, thereby improving user's convenience and printing efficiency.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept are achieved by providing a method of controlling an image forming apparatus, the method including: checking a data file; determining whether the data file is printable; and converting an extension of the data file into a printable extension when the data file is determined to be printable.

The determining can be performed by utilizing at least one of an extension of the data file and a header of the data file.

In the converting operation, a header content of the data file can be analyzed in order to determine whether the data file is printable and the extension of the data file is converted into printable data when the data file is determined to be printable.

The method may further include displaying extension information of the data file.

The displayed extension information can include printable or non-printable extension information.

The displayed extension information can be selectable by a user, and can be editable.

In the displaying operation, the extension information can be displayed for each group of the data file.

In the displaying operation, the extension information including a specific code representing the printable extension is displayed.

In the displaying operation, data files having the printable extensions can be sequentially displayed or data files can be displayed in an order of a priority that is established according to the specific codes thereof.

In the displaying operation, data files having the extension information selected by a user can be exclusively displayed.

The method may further include printing the data file after the converting operation.

In the converting operation, if the data file is printable, it is determined whether the extension of the data file is registered as a printable extension, and if the extension of the data file is not registered as the printable extension even though the data file is printable, the extension of the data file is converted into the printable extension.

The foregoing and/or other aspects and utilities of the present general inventive concept can also be achieved by providing a method of controlling an image forming apparatus to which a storage medium having a plurality of data files is connected, the method including: determining whether there are data files having extensions that are not registered in the image forming apparatus and whether the data files are printable; registering the extensions of the data files in the image forming apparatus if the data files are printable; and exclusively displaying the data files having the extensions registered in the image forming apparatus.

The foregoing and/or other aspects and utilities of the present general inventive concept can also be achieved by providing an image forming apparatus including a memory unit in which printable extensions are stored; a controller that determines whether data files are printable and registers extensions of the data files in the memory unit as printable extensions if the data files are printable; and a printing unit to print the data file.

The controller can determine whether the extension of the data file is a printable extension, and can analyze a header content of the data file to determine whether the data file is printable when the extension of the data file is determined not to be a printable extension, in which the controller registers the extension of the data file in the memory unit as a printable extension when the data file is determined to be printable.

The controller can register the printable extension in the memory unit and delete or modify the printable extension stored in the memory unit according to a command of a user.

The foregoing and/or other aspects and utilities of the present general inventive concept can also be achieved by providing an image forming apparatus including: a memory unit in which printable extensions are stored; a key input unit to input data files; a controller that determines whether an extension of the data file is a printable extension, and analyzes a header content of the data file to determine whether the data file is printable when the extension of the data file is determined not to be a printable extension, in which the controller registers the extension of the data file in the memory unit as a printable extension when the data file is determined to be printable based on the header content; and a display unit to display the data files.

The controller can register the printable extension in the memory unit and delete or modify the printable extension stored in the memory unit according to a command of a user.

The image forming apparatus may further include a printing unit that prints the data files.

The foregoing and/or other aspects and utilities of the present general inventive concept can also be achieved by providing a method of controlling an image forming apparatus, the method including: analyzing an extension of a data file to determine whether the data file is printable; and determining whether to convert the extension of the data file into a printable extension based on an analysis of header information of the data file if it can not be determined whether the data file is printable based on the extension of the data file.

The method may further include converting an extension of the data file into a printable extension when the data file is determined to be printable based on the analysis of the header information.

The foregoing and/or other aspects and utilities of the present general inventive concept can also be achieved by providing a method of controlling an image forming apparatus to which a storage medium having a plurality of data files is connected, the method including: analyzing extensions of the plurality of data files to determine whether each of the data files are printable; and determining whether to register any of the extensions of the data files which can not be determined to be printable by analyzing the extensions as printable extensions based on an analysis of header information of each of the printable data files which can not be determined to be printable by analyzing the extensions.

The method may further include registering the extensions of the data files in the image forming apparatus if the data files are determined to be printable based on the analysis of the header information.

The method may further include displaying only the extensions of the data files having the extensions registered in the image forming apparatus, and printing the data files selected by the user.

BRIEF DESCRIPTION OF THE DRAWINGS

The above and other aspects, features and utilities of the present general inventive concept will be more apparent from the following detailed description taken in conjunction with the accompanying drawings, in which:

FIG. 2 is a view illustrating the structure of a table in the memory unit of FIG. 1;

FIG. 3 is a view illustrating a table obtained by additionally registering a jp extension in the table of FIG. 2;

DETAILED DESCRIPTION OF THE PREFERRED EMBODIMENTS

Figure 1:
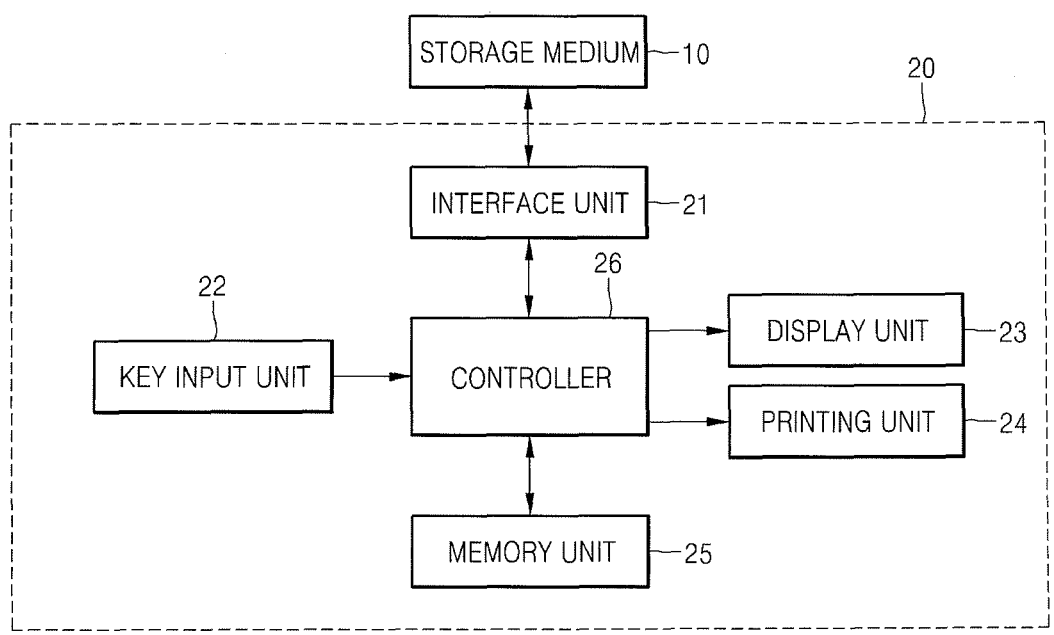
FIG. 1 is a block diagram of an image forming apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram of an image forming apparatus according to an embodiment of the present general inventive concept. Referring to FIG. 1, a storage medium 10 is electronically connected to an image forming apparatus 20.

Image files composed of photographs or pictures and text files composed of documents are stored in the storage medium 10.

When the storage medium 10 is connected to the image forming apparatus 20, the image forming apparatus 20 outputs a file selected by a user to a printing sheet among the files registered in the storage medium 10.

The storage medium 10 and the image forming apparatus 20 can be connected to each other using, for example, a universal serial bus (USB) cable. However the storage medium 10 and the image forming apparatus 20 can alternatively be connected to each other wirelessly.

The image forming apparatus 20 includes an interface unit 21, a key input unit 22, a display unit 23, a printing unit 24, a memory unit 25, and a controller 26.

The interface unit 21 provides an interface with the storage medium 10 and performs communications to exchange information between the storage medium 10 and the image forming apparatus 20 and transmits files.

To be more specific, when the storage medium 10 is connected to the image forming apparatus 20, the interface unit 21 transmits information on the file stored in the storage medium 10 to the controller 26 to be described later. The interface unit 21 transmits the file selected by the user to the controller 26 so that the file can be output.

A key input unit 22 receives a user's command. In particular, the key input unit 22 receives a data file to be printed from the user.

A display unit 23 can be formed of a liquid crystal display (LCD) or a light emitting diode (LED) to display the operation state of the image forming apparatus. In particular, the display unit 23 displays the list of the files stored in the storage medium 10.

The format types and extensions that can be printed by the image forming apparatus 20 are previously registered and stored in the memory unit 25.

The printing unit 24 prints a printable file on the printing sheet among the files stored in the storage medium 10 in accordance with the control signal of the controller 26.

The controller 26 controls the components of the above-described image forming apparatus to print the file stored in the storage medium 10.

The operation of the controller 26 according to an embodiment of the present general inventive concept will now be described. First, when the storage medium 10 is connected to the interface unit 21, the controller 26 senses whether the storage medium 10 is connected.

When the connection of the storage medium 10 is sensed, the controller 26 controls the interface unit 21 to receive all of the files stored in the storage medium 10. The controller 26 displays all of the received files on the display unit 23.

When the user selects the data file to be printed among the data files displayed on the display unit 23 through the key input unit 22, the controller 26 determines whether the file selected by the user is a printable file in accordance with the file information on the data file selected by the user. At this time, the file information includes the extension and the header content of the data file. The extension is a character that follows the period of a file name in order to clarify the format types of the file. The extensions of files that can be printed by the image forming apparatus are *.jpg, *.hwp, *.HLT, *.HML, and *.TXT. The header content is a group of characters placed in the head of the data file and includes information such as the content and characteristic of the file. That is, the controller 26 compares the extension of the file selected by the user with an extension of a file that can be printed by the image forming apparatus that is stored in the memory unit 25 in order to determine whether the file selected by the user is a printable file. The controller also analyzes the header content of the file selected by the user to determine whether the file selected by the user is the printable file when it is determined that the extension of the file selected by the user does not coincide with the extension of the printable file. When the header content is analyzed to determine that the file is not the printable file, it is displayed on the display unit 23 that the file cannot be printed. On the other hand, when the header content is analyzed to determine that the file is the printable file, the extension of the corresponding data file is then registered in the memory unit 25 as a printable extension. Then, the data file having the corresponding extension is determined to be a printable file without additionally analyzing the header content at future occurrences of when the data file is selected by a user to be printed.

As an example, as illustrated in FIG. 2, in a case where the printable extensions such as jpg, jpe, and jpeg for the JPEG format are registered in the memory unit 25, when the data file selected by the user to be printed is XXX.jp, the extension *.jp of the data file selected by the user is not registered as a printable extension in the memory unit 25. Therefore, it is then determined whether the XXX.jp file is a printable file by analyzing the header content of the XX.jp file. When the analysis result of the header content exhibits that the format type of the XXX.jp file is the JPEG format registered and is stored in the memory unit 25 so that the XXX.jp file is actually printable, as illustrated in FIG. 3, the *.jp extension is then registered as a printable extension for the JPEG format. Therefore, the file having the *.jp extension can be determined to be a printable file in future occurrences when the data file is requested to be printed without additionally analyzing the header content, so that it is possible to reduce the printing time. At this time, the printable extension registered and stored in the memory unit 25 can be registered, deleted, and modified.

Figure 4:
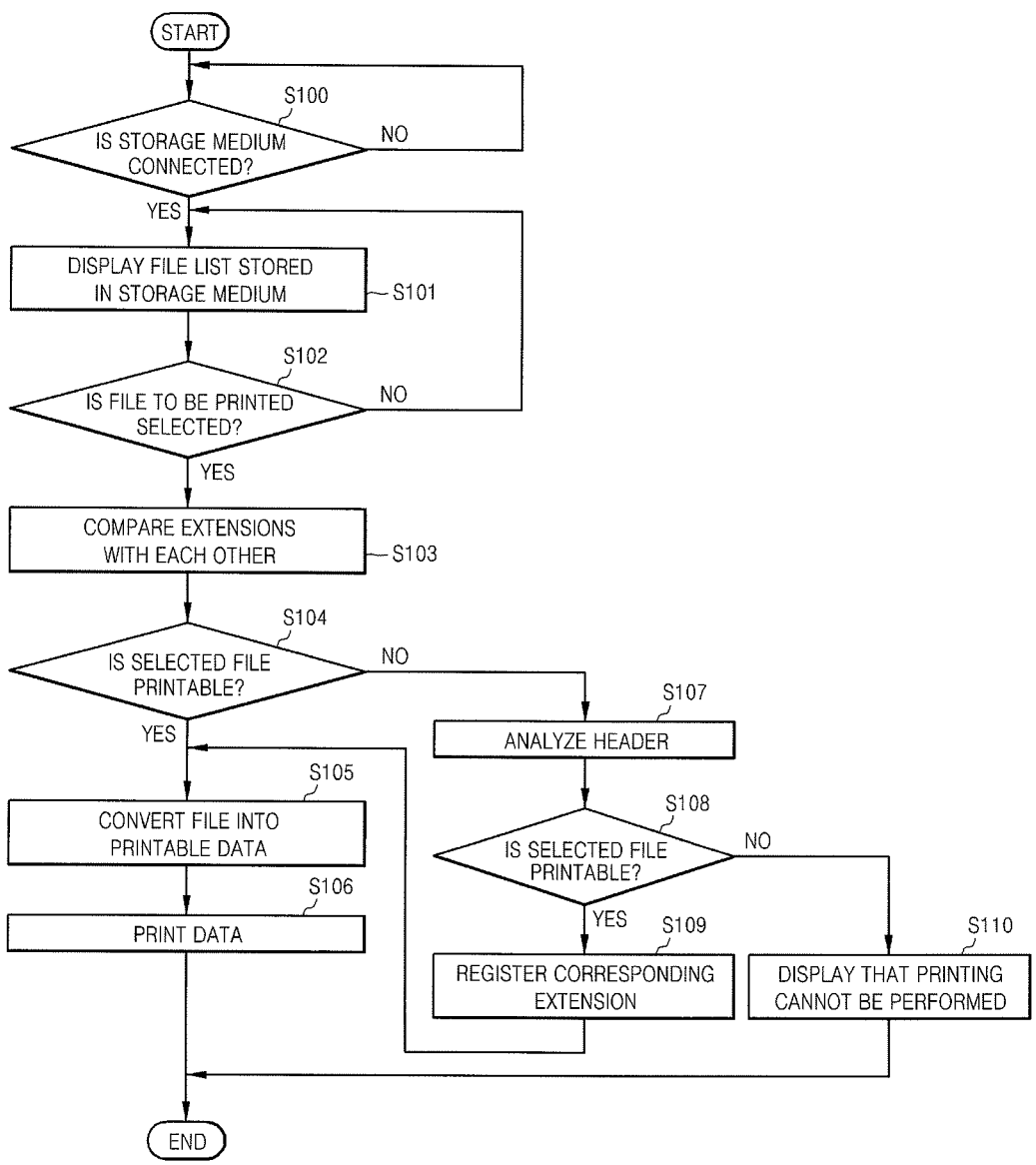
FIG. 4 is a flowchart illustrating a method of controlling the image forming apparatus of FIG. 1 according to another embodiment of the present general inventive concept.

Hereinafter, an operation of the controller will be described in more detail with reference to FIG. 4. Referring to FIG. 4, the controller 26 determines whether the storage medium 10 is connected in operation S100. When it is determined in operation S100 that the storage medium 10 is connected, the controller 26 controls the interface unit 21 to read information of the files stored in the storage medium 10 and to display the file list on the display unit 23 in operation S101. Therefore, the user selects a file to be printed by using the key input unit 22. At this time, a plurality of files can be selected.

Then, the controller 26 determines whether the file selected by the user exists in operation S102. When it is determined that the file selected by the user exists, the extension selected by the user in operation S103 is compared with printable extensions stored in the memory unit 25. Then, it is determined whether the extension of the file selected by the user is printable by determining whether the extension of the file selected by the user is registered as a printable extension in operation S104.

When it is determined in S104 that the extension of the file selected by the user is registered in the memory unit 25 as a printable extension, the extension of the file selected the user is regarded as a printable extension. Thus, the file selected by the user is converted into printable data to print the data on a printing sheet by the printing unit 24 in operations S105 and S106.

On the other hand, when it is determined in operation S104 that the extension of the file selected by the user is not registered in the memory unit 25, the extension of the file selected the user is initially regarded as a non-printable extension. In this case, the header information of the file selected by the user is then analyzed in operation S107, and it is then determined in operation S108 whether the file selected by the user is the printable file using the analyzed result. When it is determined in operation S108 that the file selected by the user is not a printable file, it is displayed that printing cannot be performed by the display unit 23 in operation S110. On the other hand, when it is determined in operation S108 that the file selected by the user is a printable file by analyzing the header information, the extension of the file selected by the user is then registered in the memory unit 25 as a printable extension in operation S109. Therefore, the data file having the corresponding extension can be determined as being a printable file without additionally analyzing the header information at future occurrences of a request to print the file, so that it is possible to reduce later printing times.

After the extension of the file selected by the user is registered in the memory unit 25 as a printable extension in operation S109 and the file selected by the user is converted into printable data in operations S105 and S106, the data is printed on the printing sheet by the printing unit 24.

Figure 5:
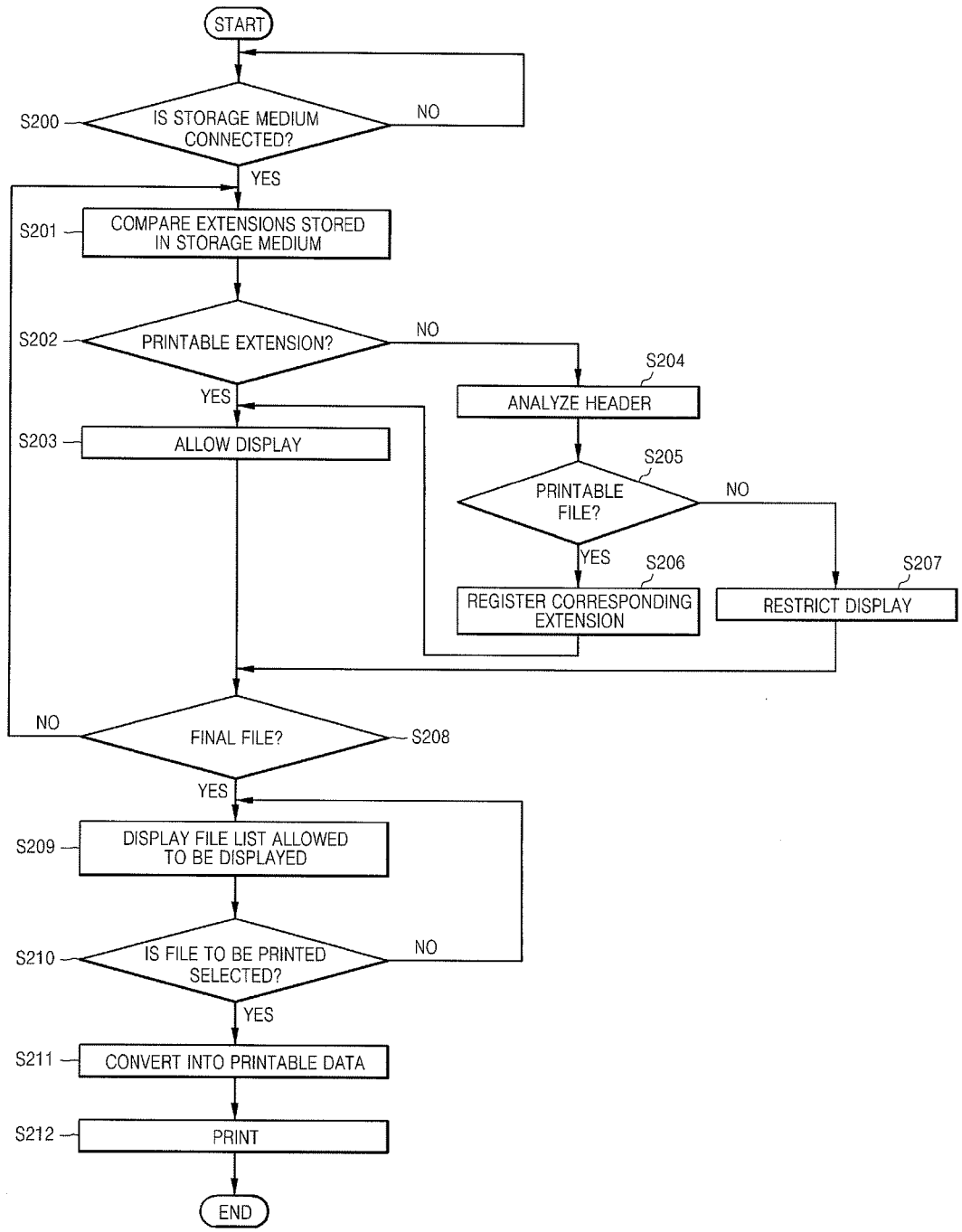
FIG. 5 is a flowchart illustrating a method of controlling the image forming apparatus of FIG. 1 according to yet another embodiment of the present general inventive concept.

Hereinafter, an operation of the controller 26 according to another embodiment will be described with reference to FIG. 5. The controller 26 determines whether the storage medium 10 is connected to the image forming apparatus by detecting the storage medium 10 in operation S200.

If the storage medium 10 is determined to be connected to the image forming apparatus, the controller 26 controls the interface unit 21 to read information of files stored in the storage medium 10. Then, the controller 26 compares the extensions of the files stored in the storage medium 10 with the printable extensions stored in the memory unit 25 in operation S201, and determines whether the extensions of the files stored in the storage medium 10 are registered as printable extensions in operation S202, thereby determining whether the extensions of the files stored in the storage medium 10 are printable.

If it is determined in operation S202 that the extension of the file stored in the storage medium 10 is registered in the memory unit 25, the extension is regarded as a printable extension. In this case, the controller 26 allows the file to be displayed in operation S203.

In contrast, if it is determined in operation S202 that the extension of the file stored in the storage medium 10 is not registered in the memory unit 25, the extension is regarded as a non-printable extension. In this case, the controller 26 then analyses header information of the file stored in the storage medium 10 in operation S204. Then, the controller 26 determines based on the analyzed header information whether the file stored in the storage medium 10 is printable in operation S205. If it is determined in operation S205 that the file stored in the storage medium 10 is not printable based on the analysis of the header information, the controller 26 restricts the display of the file in operation S207. In contrast, if it is determined in operation S205 that the file stored in the storage medium 10 is printable, the extension of the file is then registered in the memory unit 25 as a printable extension in operation S206. In this case, the file is allowed to be displayed in operation S203. Accordingly, the data file having the above registered extension can be determined as a printable file without future analyzing of the header information, so that the file can be displayed within a short period of time. In addition, since it is no longer necessary to analyze header information for the data file having the above extension upon future requests to print the data file, the printing time can be shortened.

After the above operations are performed, it is determined whether the data file is a final file in operation S208. If the data file is determined not to be the final file, the procedure returns to operation S201 to perform the following operations. In contrast, if it is determined in operation S208 that the data file is the final file, the file list that is allowed to be displayed is displayed through the display unit 23 in operation S209. At this time, the file list can be displayed according to the extensions of the data files. For instance, the data files can be displayed according to the extensions, such as jpg, bmp, tiff, etc. In addition, in order to allow the user to readily recognize the printable extensions, specific codes representing the printable extensions may be added to the data files. Further, data files having the printable extensions can be sequentially displayed or can be displayed in the order of priority that is established according to the specific codes thereof. In addition, it is also possible to display data files having extension information selected by the user.

After displaying the file list, it is determined whether the file to be printed is selected from the file list by the user in operation S210. If the file is selected by the user in operation S210, the file is converted into the printable data in operation S211 and is printed on a printing medium by means of the printing unit 24 in operation S212.

As described above, according to the embodiment of the present general inventive concept, although extensions of the data file to be printed may not be registered as printable extensions in the image forming apparatus, when the header content of the data file is analyzed to determine that the data file is printable, the corresponding extension is registered as the printable extension in the image forming apparatus. Then, the same extension can be determined as a printable extension without additionally analyzing the header content so that it is possible to reduce the printing time.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of controlling an image forming apparatus, the method comprising:
   determining whether an extension of a data file selected by a user is registered in the image forming apparatus;
   determining whether the data file is printable by analyzing a header of the data file, if the extension is determined to not be registered in the image forming apparatus;
   registering the extension of the data file in the image forming apparatus as a printable extension, if the data file is determined to be printable; and
   printing the data file with the extension registered in the image forming apparatus,
   wherein if a data file with the registered extension is selected after the registering the extension in the image forming apparatus, the data file with the registered extension is printed without analyzing a header of the data file.

2. The method as claimed in claim 1, further comprising: displaying extension information of the data file.

3. The method as claimed in claim 2, wherein the displayed extension information includes printable or non-printable extension information.

4. The method as claimed in claim 2, wherein the displayed extension information is selectable by a user.

5. The method as claimed in claim 2, wherein the displayed extension information is editable.

6. The method as claimed in claim 2, wherein, in the displaying operation, the extension information is displayed for each group of the data file.

7. The method as claimed in claim 2, wherein, in the displaying operation, the extension information including a specific code representing the printable extension is displayed.

8. The method as claimed in claim 7, wherein, in the displaying operation, data files having the printable extensions are sequentially displayed or data files are displayed in an order of a priority that is established according to the specific codes thereof.

9. The method as claimed in claim 2, wherein, in the displaying operation, data files having the extension information selected by a user are exclusively displayed.

10. The method as claimed in claim 1, further comprising: printing the data file after the converting operation.

11. A method of controlling an image forming apparatus to which a storage medium having a plurality of data files is connected, the method comprising:
    determining whether any of the data files have an extension that is not registered in the image forming apparatus;
    determining whether any of the data files having an unregistered extension are printable by the image forming apparatus;
    registering the unregistered extension of any of the data files that are determined to be printable, in the image forming apparatus as a printable extension; and
    exclusively displaying the data files that have one of the registered extensions,
    wherein if one of the plurality of data file with the registered extension is selected after the registering the extension in the image forming apparatus, the data file with the registered extension is printed without analyzing a header to the data file.

12. An image forming apparatus comprising:
    a memory unit in which printable extensions are stored;
    a controller configured to determine whether a data file selected by a user having an extension that is not stored in the memory unit is printable, and to register the extension of the data file in the memory unit as a printable extension if the data file is determined to be printable; and a printing unit to print the data file, wherein if a data file with the registered extension is selected after the registering the extension in the memory unit, the data file with the registered extension is printed without the analyzing a header of the data file.

13. The image forming apparatus as claimed in claim 12, wherein the controller determines whether the data file is printable, by analyzing a header of the data file.

14. The image forming apparatus as claimed in claim 12, wherein the controller is configured to delete or modify the printable extensions stored in the memory unit, according to a command of a user.

15. An image forming apparatus comprising:

a memory unit in which printable extensions are stored;

a key input unit to receive a data file selected by a user; and a controller configured to determine whether an extension of the data file is a printable extension stored in the memory unit, to analyze a header content of the data file to determine whether the data file is printable, if the extension of the data file is determined not to be a stored printable extension, and to register the extension of the data file in the memory unit as a printable extension if the data file is determined to be printable, wherein if a data file with the registered extension is selected after the registering the extension in the memory unit, the data file with the same extension is printed without analyzing a header of the data file.

16. The image forming apparatus as claimed in claim 15, wherein the controller is configured to delete or modify the printable extensions stored in the memory unit, according to a command of a user.

17. The image forming apparatus as claimed in claim 15, further comprising:

a printing unit that prints the data files.

18. A method of controlling an image forming apparatus connected to a storage medium having data files stored therein, the method comprising:

analyzing extensions of the data files to determine whether any of the extensions are not registered in the image forming apparatus as printable extensions;

determining whether any of the unregistered extensions should be registered in the image forming apparatus as printable extensions, by analyzing header information of the corresponding data files; and registering the unregistered extension of any of the data files that are determined to be printable, in the image forming apparatus as a printable extension, wherein if one of the plurality of data file with the registered extension is selected after the registering the extension in the image forming apparatus, the data file with the registered extension is printed without analyzing a header of the data file.

19. The method as claimed in claim 18, further comprising:

registering the determined unregistered extensions in the image forming apparatus.

20. The method as claimed in claim 19, further comprising:

displaying only the data files having the registered extensions on a display of the image forming apparatus; and printing user-selected ones of the displayed data files.

* * * * *

UNITED STATES PATENT AND TRADEMARK OFFICE
CERTIFICATE OF CORRECTION

| | | |
|---|---|---|
| PATENT NO. | : 9,007,620 B2 | Page 1 of 1 |
| APPLICATION NO. | : 12/025262 | |
| DATED | : April 14, 2015 | |
| INVENTOR(S) | : Seong Il Park | |

It is certified that error appears in the above-identified patent and that said Letters Patent is hereby corrected as shown below:

Title page, item (57) Abstract, Line 4

After "analyzing" insert --the--.

Claims

Claim 1, Column 8, Line 9-10

Delete "to not be" and insert --not to be--, therefor.

Claim 11, Column 8, Line 63

Delete "to" and insert --of--, therefor.

Claim 12, Column 9, Line 9

After "without" delete "the".

Signed and Sealed this
Twentieth Day of October, 2015

Michelle K. Lee
*Director of the United States Patent and Trademark Office*